Figure 1:
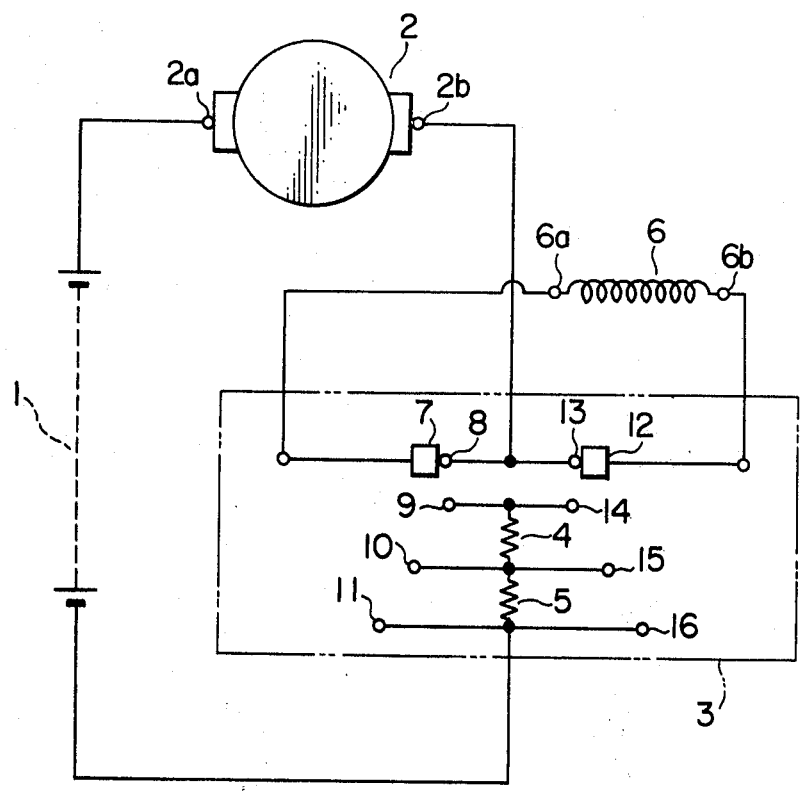

United States Patent [19]
Nakano

[11] 3,971,973
[45] July 27, 1976

[54] RHEOSTATIC CONTROL SYSTEM FOR A DC MOTOR

[75] Inventor: Yoshinori Nakano, Tokoname, Japan

[73] Assignees: Nippondenso Co., Ltd.; Kabushiki Kaisha Toyoda Jidoshokki Seisakusho, both of Kariya, Japan

[22] Filed: July 23, 1974

[21] Appl. No.: 491,126

[30] Foreign Application Priority Data
July 24, 1973    Japan.............................. 48-83814

[52] U.S. Cl.............................. 318/251; 318/257; 318/300
[51] Int. Cl.² ......................................... H02P 7/08
[58] Field of Search ........... 318/256, 257, 260, 280, 318/291, 293, 295, 300, 251, 252, 296, 297, 420–422, 245, 249, 246, 139, 357–359

[56] References Cited
UNITED STATES PATENTS

| | | |
|---|---|---|
| 609,639 | 8/1898 | Wappler ........................ 318/300 X |
| 1,912,411 | 6/1933 | Stansbury ...................... 318/300 X |
| 2,217,254 | 10/1940 | Langgasser ..................... 318/257 X |
| 2,363,132 | 11/1944 | Lightfoot et al................ 318/295 X |
| 2,743,408 | 4/1956 | Schmitt............................. 318/257 |

Primary Examiner—Robert K. Schaefer
Assistant Examiner—W. E. Duncanson, Jr.
Attorney, Agent, or Firm—Cushman, Darby & Cushman

[57] ABSTRACT

A rheostatic control system for controlling the speed and the direction of rotation of a DC motor which is employed mainly for controlling the speed of an electric vehicle or the like. The system comprises a sliding-contact rheostatic unit which is provided between a DC power supply and a DC motor and which includes stationary contacts and speed controlling resistors, whereby the speed control of the DC motor is accomplished by means of the speed controlling resistors, and the rotation of the DC motor in either direction is controlled by changing the polarity of the voltage applied to the polarity changing terminals of the DC motor.

12 Claims, 2 Drawing Figures

RHEOSTATIC CONTROL SYSTEM FOR A DC MOTOR

The present invention relates to an improved system for controlling the speed and direction of rotation of a DC motor which is mainly employed for controlling the speed of an electric vehicle.

In known systems of the above type, it has been customary to employ two separate mechanisms, i.e., a speed control mechanism and a direction of motor rotation control mechanism for effecting the speed control and rotating direction control of an electric vehicle. A disadvantage of this conventional system is that the circuit construction is complicated and the maintenance and inspection of the system require the check on the two different mechanisms, i.e., the speed control mechanism and the direction of motor rotation control mechanism. Another disadvantage is that in the actual operation, two different operations, i.e., a speed control operation and a direction of motor rotation control operation are required.

With a view to overcoming the foregoing difficulty, it is an object of the present invention to provide a rheostatic control system for a DC motor which employs a sliding-contact rheostatic unit having two sliding movable contacts to simplify the circuit construction and make the maintenance and inspection easier and which is capable of accomplishing both the speed control and the direction of rotation control of the DC motor through a single operation.

It is another object of the present invention to provide such a rheostatic control system for a DC motor which, when used in an electric vehicle having two pedals (forward and reverse pedales), two levers (forward and reverse levers) or a single lever operable in a different way (between the forward and reverse directions) for the forward and reverse movements, has various advantages such as the simplicity of operation, wiring and construction, simplified maintenance and inspection and improved safety against malfunctions and fusing of the contacts.

Figure 2:
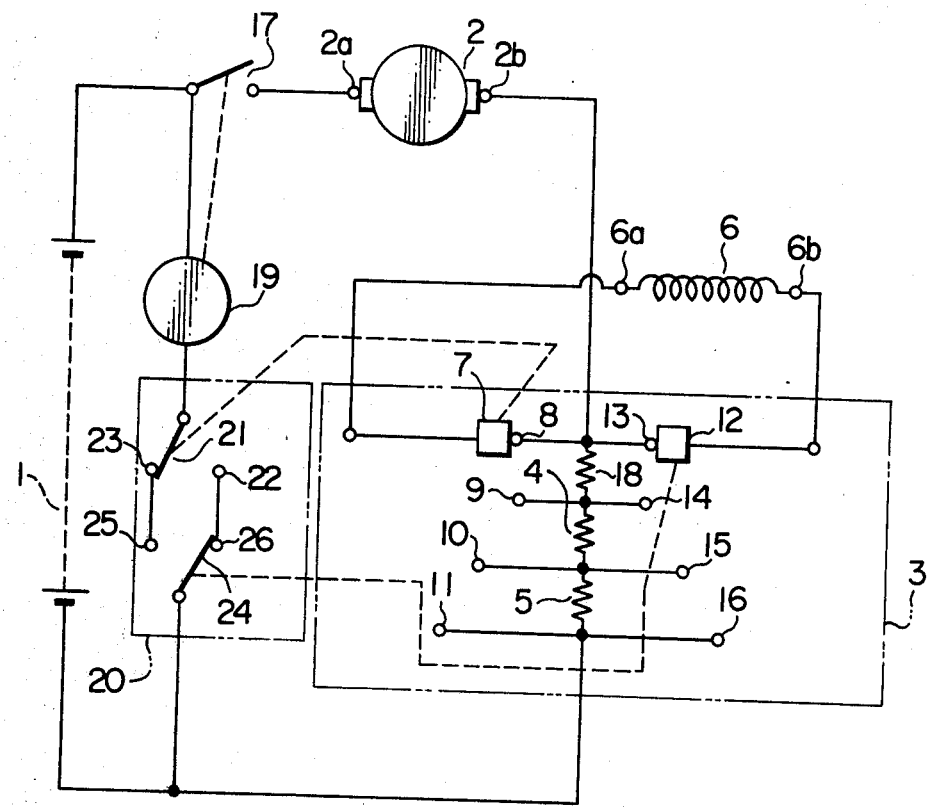

The above and other objects, features and advantages of the present invention will become readily apparent from considering the following detailed description in conjunction with the accompanying drawings, in which:

FIG. 1 is a wiring diagram showing an embodiment of a rheostatic control system for a DC motor according to the present invention; and FIG. 2 is a wiring diagram showing another embodiment of the system of this invention.

The present invention will now be described in greater detail with reference to the illustrated embodiments.

Referring first to FIG. 1 showing a first embodiment of the invention, numeral 1 designates a DC power supply, 2 the armature of a DC motor, 2a and 2b supply terminals connected to the armature terminals, 3 a sliding-contact rheostatic unit having two sliding movable contacts 7 and 12. The sliding movable contacts 7 and 12 are respectively actuated by the forward and reverse pedals or the forward and reverse levers of an electric automotive vehicle. Numerals 4 and 5 designate speed controlling resistors, 6 a field coil of the DC motor, 6a and 6b polarity changing terminals connected to both ends of the field coil 6, 8, 9, 10 and 11 sliding stationary contacts provided on one side of the sliding-contact rheostatic unit 3 to come into sliding contact with the sliding movable contact 7. Numerals 13, 14, 15 and 16 designate sliding stationary contacts provided on the other side of the sliding-contact rheostatic unit 3 to come into sliding contact with the sliding movable contact 12.

With the construction described above, the first embodiment operates as follows. When the movable contact 7 moved over the stationary contacts 8, 9, 10 and 11 is in a position in which it is electrically connected to the stationary contact 9, current flows from the DC power supply 1 through a loop comprising the supply terminal 2a, the armature 2, the supply terminal 2b, the stationary contact 13, the movable contact 12, the polarity changing terminal 6b, the field coil 6, the polarity changing terminal 6a, the movable contact 7, the stationary contact 9, and the speed controlling resistors 4 and 5, and thus the armature 2 rotates at a low speed. On the other hand, when the movable contact 7 is electrically connected to the stationary contact 10, the speed controlling resistor 4 is eliminated from the above low speed current loop and thus the armature 2 rotates at an intermediate speed. When the movable contact 7 comes into electrical contact with the stationary contact 11, the speed controlling resistors 4 and 5 are both eliminated from the low speed current loop and thus the armature 2 rotates at a high speed. The sequence of operations just described occur during the acceleration period and the operations are the same in principle for deceleration in which case the movable contact 7 slides over the stationary contacts 11, 10, 9 and 8 in this order.

On the other hand, when the movable contact 12 is moved over the stationary contacts 13, 14, 15 and 16, the armature rotates as follows. When the movable contact 12 is electrically connected to the stationary contact 14, current flows from the DC power supply 1 through a loop comprising the supply terminal 2a, the armature 2, the supply terminal 2b, the stationary contact 8, the movable contact 7, the polarity changing terminal 6a, the field coil 6, the polarity changing terminal 6b, the movable contact 12, the stationary contact 14 and the speed controlling resistors 4 and 5, and thus the armature 2 rotates at the low speed. In this case, however, the current flows through the field coil 6 in a direction opposite to that of the previously mentioned case, and thus the direction of rotation of the armature 2 is also reversed. The remaining operations are the same in principle with the case when the movable contact 7 is moved over the associated stationary contacts since the symmetrical arrangement is used in which the movable contact may be substituted for the other movable contact 12 and the stationary contacts 8, 9, 10 and 11 may be substituted for the stationary contacts 13, 14, 15 and 16.

When the movable contacts 7 and 12 are moved simultaneously, no current flows through the armature 2 and it does not rotate, since the armature 2 is disconnected with the negative terminal of the DC power supply 1 between the stationary contacts 8 and 9 and between the stationary contacts 13 and 14. Consequently, the safe operation is ensured, since no malfunction that would cause the movable contacts 7 and 12 to move simultaneously can cause any damage to the circuit elements and since the armature 2 cannot be caused to rotate by such a malfunction.

FIG. 2 illustrates a second embodiment of the system according to the invention. In FIG. 2 the like reference numerals as used in FIG. 1 designate the like elements. Numeral 17 designates an electromagnetic switch for the main circuit, 18 an arc suppressing resistor having a large resistance value, 19 an exciting coil of the main circuit electromagnetic switch 17, 20 a starting switch operatively associated with movable contacts 7 and 12, 21 a movable contact of the starting switch 20 which cooperates with a normally open stationary contact 22 and a normally closed stationary contact 23 and which is operatively associated with the movable contact 7. Numeral 24 designates a movable contact of the starting switch 20 which cooperates with a normally open stationary contact 25 and a normally closed stationary contact 26 and which is operatively associated with the movable contact 12. The main circuit switch 17 is connected in series with the main circuit, and the arc suppressing resistor 18 is connected between the stationary contacts 8 and 9 (between 13 and 14). The exciting coil 19 of the main circuit 17 and the starting switch 20 are connected in a series circuit across the DC power supply 1. In the starting switch 20, the normally open stationary contact 22 is connected to the normally closed stationary contact 26 and the normally closed stationary contact 23 is connected to the normally open stationary contact 25. The movable contacts 21 and 24 constitute external temrinals.

With the construction described above, the second embodiment operates as follows. In this case, it is arranged so that when the movable contact 7 moved over the stationary contacts 8, 9, 10 and 11 comes into a position in which it is electrically connected to the stationary contact 9, the movable contact 21 of the stating switch 20 is electrically connected to the normally open stationary contact 22. When this occurs, the exciting coil 19 of the main circuit switch 17 is energized to close the main circuit switch 17. Consequently, a flow of current is caused from the DC power supply 1 through a loop comprising the main circuit switch 17, the supply terminal 2a, the armature 2, the supply terminal 2b, the stationary constant 13, the movable contact 12, the polarity changing terminal 6b, the field coil 6, the polarity changing terminal 6a, the movable contact 7, the stationary contact 9 and the speed controlling resistors 4 and 5, and thus the armature 2 rotates at a low speed. In this case, since the arc suppressing resistor 18 is connected in parallel with the field coil 6, a current caused by the resistance division of the field coil 6 and the arc suppressing resistor 18 flow through the latter. The value of this current is preset so small that it can be ignored in the operation of the DC motor. When the movable contact 7 is electrically connected to the stationary contact 10, the speed controlling resistor 4 is eliminated from the low speed current loop and thus the armature 2 rotates at an intermediate speed. In this case, since a series combination of the arc suppressing resistor 18 and the speed controlling resistor 4 are connected in parallel with the field coil 6, the value of the current flowing through the arc suppressing resistor 18 is smaller than that of the current flow during the low speed operation. Further, when the movable contact 7 is electrically connected to the stationary contact 11, the speed controlling resistors 4 and 5 are both eliminated from the low speed current loop and thus the armature 2 rotates at a high speed. In this case, a series combination of the arc suppressing resistor 18 and the speed controlling resistors 4 and 5 is connected in parallel with the field coil 6, with the result that the value of the current flowing through the arc suppressing resistor 18 is reduced further as compared with those flowing during the low speed and intermediate speed operations, and thus the difference between the value of the current flowing through the armature 2 and that of the current flowing through the field coil 6 is reduced as compared with those obtained during the low and intermediate speed operations. While the operations described so far take place under the aceleration operating conditions, under the deceleration operating conditions where the movable contact 7 is moved over the stationary contacts 11, 10, 9 and 8 in this order, the similar operations take place during the high and intermediate speed operations, but the operation that takes place during the transition period from the low speed operation to the initial state of the stopped motor differs as will be described hereinafter. When the movable contact 7 is electrically connected to the stationary contact 9, the movable contact 21 of the starting switch 20 which previously was connected electrically to the normally open stationary contact 22 is moved into electrical contact with the normally closed stationary contact 23. Consequently, the exciting coil 19 of the main circuit switch 17 is deenergized and the main circuit switch 17 is opened to stop the rotation of the DC motor. When this occurs, the movable contact 7 comes into contact with the stationary contact 8 and the DC motor is placed back into the initial state. In practice, however, when the movable contact 7 is in the position in which it is electrically connected to the stationary contact 9, the movable contact 21 of the starting switch 20 is operated so that it is moved from the normally open stationary contact 22 with which it previously was connected electrically into electrical contact with the normally closed stationary contact 23 and the exciting coil 19 of the main circuit switch 17 is deenergized. However, since a certain delay time is required between the deenergization of the exciting coil 19 and the time at which the main circuit switch 17 opens, it is not infrequent that the main circuit switch 17 actually opens only after the movable contact 7 has moved from the stationary contact 9 to the stationary contact 8. In this case, without the arc suppressing resistor 18 and with the stationary contacts 8 and 9 opened, the current flow through the main circuit is interrupted by the movable contact 7 and the stationary contact 9 and therefore the movable contact 7 and the stationary contact 9 wear severly to shorten the life thereof. On the contrary, with the arc suppressing resistor 18 connected between the stationary contacts 8 and 9, the arc that occurs on the movable contact 7 and the stationary contact 9 is reduced and thus a longer life is ensured for the movable contact 7 and the stationary contact 9.

On the other hand, with the movable contact 12 moved over the stationary contacts 13, 14, 15 and 16, it is designed so that when the movable contact 12 is in a position in which it is electrically connected to the stationary contact 14, the movable contact 24 of the starting switch 20 is electrically connected to the normally open stationary contact 25. When this occurs, the exciting coil 19 of the main circuit switch 17 is energized and the main circuit switch 17 is closed. This causes a flow of current from the DC power supply through a loop comprising the main circuit switch 17, the supply terminal 2a, the armature 2, the supply terminal 2b, the stationary contact 8, the movable contact 7, the polarity changing terminal 6a, the field coil 6, the polarity changing terminal 6b, the movable contact 12, the stationary contact 14, and the speed controlling resistors 4 and 5, and thus the armature 2 rotates at the low speed. In this case, the current through the field coil 6 flows in a direction opposite to that of the current flow in the previously described case, and therefore the direction of rotation of the armature 2 is also reversed. The remaining operations that take place in accordance with the further movement of the movable contact 12 are the same in principle with those which took place when the movable contact 7 was actuated, since the symmetrical arrangement is employed in which the movable contact 7 corresponds to the movable contact 12, the stationary contact 8, 9, 10 and 11 correspond to the stationary contacts 13, 14, 15 and 16, the movable contact 21 of the starting switch 20 corresponds to the other movable contact 24, the normally open stationary contact 22 corresponds to the other normally open stationary contact 25 and the normally closed stationary contact 23 corresponds to the other normally closed stationary contact 26. On the other hand, when the movable contacts 7 and 12 are actuated simultaneously, the movable contact 21 of the starting switch 20 is electrically connected to the normally open stationary contact 22 and the movable contact 24 is electrically connected to the normally open stationary contact 25. Consequently, the exciting coil 19 of the main circuit switch 17 is not energized and the main circuit switch 17 remains open. There is thus no current flow through the armature 2 and the armature 2 is not rotated. Thus, a high degree of safety is ensured, since the occurrence of any malfunction causing the movable contacts 7 and 12 to operate simultaneously can cause no damage to the circuit elements and moreover it cannot cause the armature 2 to rotate. On the other hand, if, by any chance, the contacts of the main circuit switch 17 are fused together, the current flows through a limited loop comprising the main circuit switch 17, the armature 2, the arc suppressing resistor 18 and the speed controlling resistors 4 and 5. Consequently, no current flows through the field coil 6 and the armature 2 is not rotated, thus ensuring a high degree of safety.

While, in the above-described embodiments of the invention, the two movable contacts 7 and 12 are respectively actuated by the forward and reverse pedals or the forward and reverse levels, it is of cource possible to actuate the movable contacts 7 and 12 by means of a single lever which is operated in a different way for each of the forward and reverse movements.

And, in the above-described embodiments, the two movable contacts 7 and 12 are designed to slide over the stationary contacts 8, 9, 10, 11, 13, 14, 15 and 16. However, it may be possible that the stationary contacts 8 and 13, 9 and 14, 10 and 15, and 11 and 16, respectively form one group on a stationary contact, and that the two movable contacts 7 and 12 are slidable on the same collected stationary contacts.

Further, while, in these embodiments, the sliding-contact rheostatic unit 3 is employed in which the stationary contacts 9, 10 and 11 and the stationary contacts 14, 15 and 16 are respectively connected to the ends of the speed controlling resistors 4 and 5 to change the connections thereof, the sliding-contact rheostatic unit 3 may be modified so that the movable contacts 7 and 12 directly slide over the speed controlling resistors 4 and 5 to vary the resistance value.

Furthermore, while in these embodiments, the armature 2 of the DC motor is connected across the DC power supply 1 through the speed controlling resistors 4 and 5 and the field coil 6 of the DC motor is connected across the movable contacts 7 and 12, it is possible to operate these embodiments in the similar manner by connecting the field coil 6 of the DC motor across the DC power supply 1 through the speed controlling resistors 4 and 5 and connecting the armature 2 of the DC motor cross the movable contacts 7 and 12.

In addition, while, in these embodiments, the system according to the invention is used in the operation of an electric vehicle, it is of course possible to use it in any other applications where the speed and the direction of rotation of a DC motor for a machine tool or the like must be controlled.

It will thus be seen from the foregoing description that the system according to the invention has among its great advantages the fact that by virtue of its novel sliding-contact rheostatic unit 3 which simultaneously serves the dual functions of the speed control and the direction of motor rotation control by a single operation through its sliding movable contacts 7 and 12, the system is simple to operate, simplified in construction and wiring and easy to maintain and inspect. Another great advantage is that a high degree of safety is ensured by the fact that the armature 2 cannot be caused to rotate by any malfunctions causing the movable contacts 7 and 12 to operate simultaneously or by the fusing of the contacts of the main circuit switch 17.

What we claim is:

1. A motor control system for an electric car including a D.C. motor having an armature, a field coil, two polarity changing terminals and two power supply terminals, one of which is connected to one terminal of a D.C. power supply, said D.C. motor forming a drive source for the electric car, said two polarity changing terminals being connected between terminals of either said armature or said field coil and said two power supply terminals being connected between terminals of the other, whereby the forward-backward rotation of said motor is controlled by changing the polarity of the voltage applied across said two polarity changing terminals from said D.C. power supply for forwardly or backward moving the electric car, said motor control system comprising:
   a. forward actuating means,
   b. independently actuable backward actuating means,
   c. slidable variable resistor means connected to said D.C. power supply and said D.C. motor and including at least a stopping stationary contact and a speed controlling resistor, one of which is connected to either one of the remainder of said two power supply terminals and the other terminal of said D.C. power supply and the other of which is connected to the other, a forward slidable contact connected to one of said two polarity changing terminals and actuated by said forward actuating means to make electrical contact with or break electrical contact of said stopping stationary contact and said speed controlling resistor, and a backward slidable contact connected to the other of said two polarity changing terminals and actuated by said backward actuating means to make electrical contact with or break electrical contact of said stopping stationary contact and said speed controlling resistor,
   whereby the forward movement and the speed of the electric car are controlled by the operation of said forward actuating means and the backward movement and the speed of the electric car are controlled by the operation of said backward actuating means.

2. A motor control system according to claim 1, wherein said stopping stationary contact comprises a forward stopping stationary contact with which said forward slidable contact with which said backward slidable contact makes or breaks, said slidable variable resistor means further includes two forward speed control stationary contacts and two backward speed control stationary contacts, each of said speed control stationary contacts being connected to one and the other terminals of said respective speed control resistor, said forward slidable contact being electrically connected with or disconnected from said speed control resistors through said forward speed control stationary contacts and said backward slidable contact being electrically connected with or disconnected from said speed control resistors through said backward speed control stationary contacts.

3. A motor control system according to claim 2, wherein said speed control resistor comprises a plurality of series-connected resistor elements, said slidable resistor means further includes forward intermediate speed control stationary contacts and backward intermediate speed control stationary contacts each connected to respective one of junctions of said resistor elements, said forward slidable contact being electrically connected with or disconnected from said forward intermediate speed control stationary contacts and said backward slidable contacts being electrically connected with or disconnected from said backward intermediate speed control stationary contacts.

4. A motor control system according to claim 2, further including a main circuit electromagnetic switch inserted in a connecting circuit between said D.C. power supply, said D.C. motor and said slidable variable resistor means, an exciting coil connected to said D.C. power supply for energizing said main circuit electromagnetic switch, and a starting switch connected in a connecting circuit between said exciting coil and said D.C. power supply.

5. A motor control system according to claim 4, wherein said starting switch comprising a forward movable contact and a backward movable contact each connected to one and other terminals between said exciting coil and said D.C. power supply, forward and backward normally open contacts and forward and backward normally close contacts each arranged in correspondence to respective one of said movable contacts, said forward normally close contact being connected to said backward normally open contact while said forward nromally open contact being connected to said backward normally close contact, said forward movable contact being switched from said forward normally close contact to said forward normally open contact in linked relation with switching of said forward slidable contact from said forward stopping stationary contact to said forward speed control stationary contact while said backward movable contact being switched from said backward normally close contact to said backward normally open contact in linked relation with the switching of said backward slidable contact from said backward stopping stationary contact to said backward speed control stationary contact.

6. A motor control switch according to claim 5, wherein said slidable variable resistor means further includes an arc killer resistor of high resistance which is connected between said stopping stationary contacts and said speed control resistors.

7. A rheostatic control system for a D.C. motor having an armature, a field coil, a pair of polarity changing terminals and a pair of power supply terminals, one of said pair of terminals being connected to said armature and the other pair being connected to said field coil comprising:
a first movable contact electrically connected to a first terminal of said polarity changing pair and adapted for connection to a common terminal,
a second separately actuable and movble contact electrically connected to the second terminal of said polarity changing pair, and adapted for connection to said common terminal,
a variable resistance having at least one stationary contact to which either of said movable contacts can be electrically connected, said variable resistance being adapted for electrical connection to the other polarity output of said D.C. power source so as to complete a current path through said polarity changing terminals when one of said movable contacts is connected to said common terminal and the other of said movable contacts is connected to a stationary contact.

8. A system as in claim 7, wherein said variable resistance includes a plurality of stationary contacts.

9. A system as in claim 7, wherein said movable contacts are connected to said field coil.

10. A system as in claim 7, further including said D.C. power source.

11. A system as in claim 7, further including a safety circuit comprising first and second serially connected switches each having its electrical condition controlled by the position of one of said movable contacts so as to complete a current path therethrough only when one of said movable contacts is connected to said common terminal and the other of said movable contacts is connected to a stationary contact and a relay having a winding connected in series with said serially connected switch to form a circuit connected in parallel with said power source and a controlled switch connected in series with the current path through said armature for completing that path only when current flows through said relay winding.

12. A motor control system according to claim 2, wherein said slidable resistor means further includes an arc suppressing resistor of high resistance value which is connected between said both stopping stationary contacts and said speed control resistors.

* * * * *